(12) United States Patent
Schuller et al.

(10) Patent No.: US 6,488,181 B1
(45) Date of Patent: Dec. 3, 2002

(54) DEVICE FOR METERING POWDER

(75) Inventors: Franz Schuller, Mengkofen (DE); Guenter Hohmann, Neckar (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/747,631

(22) Filed: Dec. 22, 2000

(51) Int. Cl.⁷ .................................................. B67D 5/00
(52) U.S. Cl. ............................ 222/161; 222/1; 222/55; 222/56; 222/196; 141/1; 141/83
(58) Field of Search ............................... 222/1, 55, 56, 222/59, 77, 161, 196, 197–200; 141/1, 83

(56) References Cited

U.S. PATENT DOCUMENTS

| | | | | |
|---|---|---|---|---|
| 2,610,726 A | * | 9/1952 | Howard | 222/55 |
| 3,865,278 A | * | 2/1975 | Gallati | 222/161 |
| 4,276,157 A | | 6/1981 | Haight | |
| 4,288,314 A | * | 9/1981 | Derderian | 222/198 |
| 4,776,493 A | | 10/1988 | Tegel | |
| 4,809,880 A | * | 3/1989 | Stein | 222/161 |
| 5,143,126 A | * | 9/1992 | Boesch et al. | 141/1 |
| 5,337,762 A | * | 8/1994 | Jedamski | 222/199 |
| 5,360,141 A | | 11/1994 | Scatizzi | |
| 5,657,902 A | * | 8/1997 | Kraus | 222/56 |
| 6,209,758 B1 | * | 4/2001 | Arslanouk et al. | 222/161 |

FOREIGN PATENT DOCUMENTS

| | | |
|---|---|---|
| DE | 1619823 | 8/1970 |
| DE | 3038269 A1 | 5/1982 |

* cited by examiner

*Primary Examiner*—J. Casimer Jacyna
(74) *Attorney, Agent, or Firm*—Steven C. Benjamin

(57) ABSTRACT

The present invention describes a device for metering powder coatings and powder components for powder and liquid coatings, which comprises a storage vessel at the outlet of which is a free-swinging receiving vessel with a metering base, wherein the receiving vessel is connected to a vibration drive, wherein the distance between the outlet of the storage vessel and the metering base of the receiving vessel is dimensioned as a function of the bulk solids properties of the powder material, wherein the metering base of the receiving vessel is vibrated during metering, and a collecting vessel beneath the receiving vessel, wherein the metered powder material is collected in the collecting vessel.

18 Claims, 1 Drawing Sheet

DEVICE FOR METERING POWDER

BACKGROUND OF THE INVENTION

Figure 1:
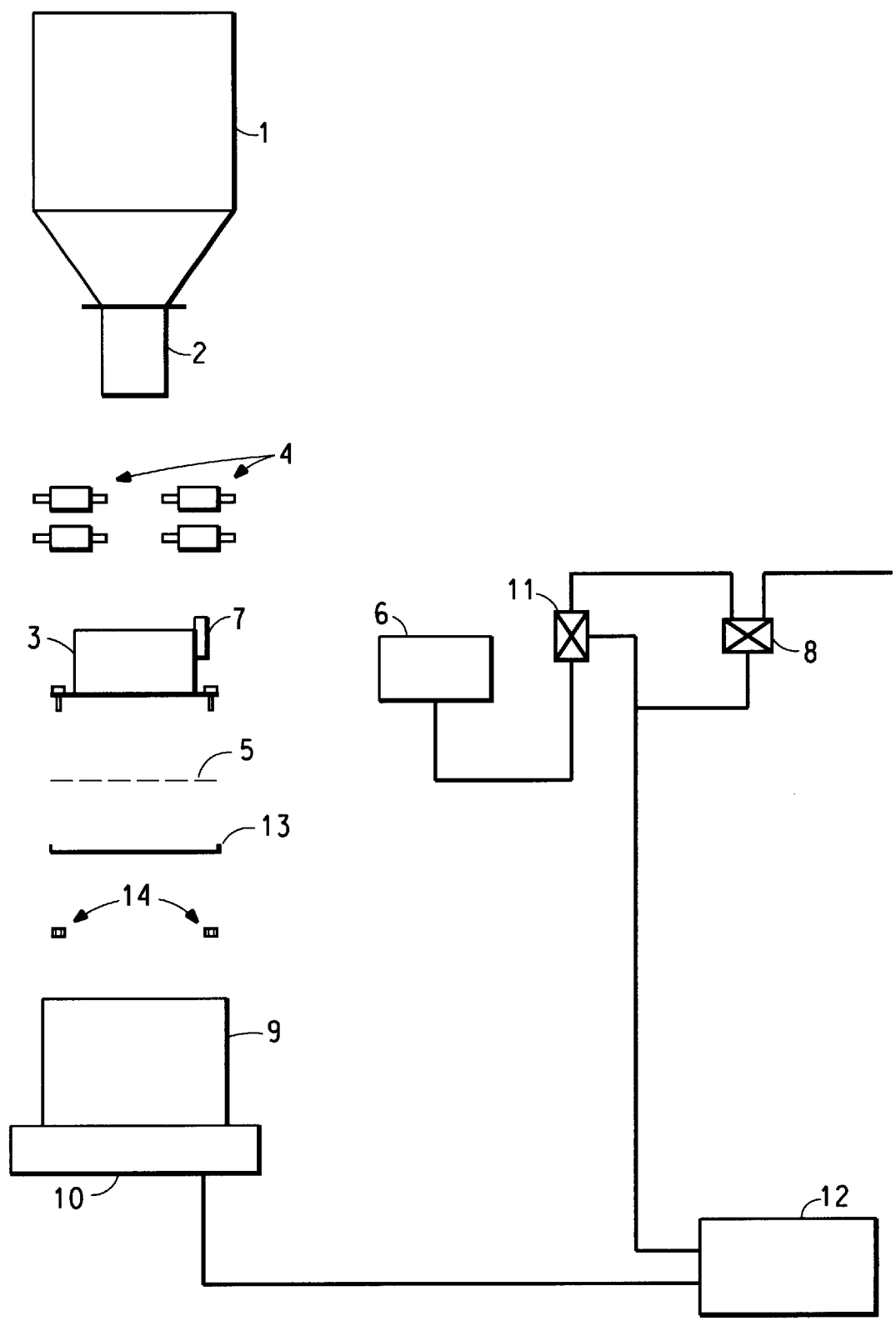

This invention relates to a device for metering free-flowing to poor-flow dry powders and powder mixtures for use in powder or liquid coating compositions.

Various possibilities are known for metering bulk solids in general and powder coatings or powder coating components in particular, e.g., feed screws, vibrating feed units, metering gates, metering valves.

Feed screws are able to convey the material to be transported or metered in any configuration and gradient but with the disadvantage that the technological properties of the metered material may be affected considerably by the shear forces of the screw. A further disadvantage is that, particularly with highly free-flowing products, accurate metering may be guaranteed only at great expense. Metering of bulk solids using vibrating feed units takes place by vibration. With very fine bulk solids, lumps or briquettes may be formed. Metering gates which may be operated electrically, pneumatically or hydraulically permit a relatively high degree of metering accuracy but they can be used only with very free-flowing materials. Metering valves, e.g., in the form of metering cones, are technically complex and may lead to caking and lumps on the valve or on the product discharge.

The metering units mentioned are therefore unsuitable in terms of metering accuracy, metering speed and discharge behaviour, particularly for poor-flow powders used in coating compositions, such as pigments and additives.

Metering devices based on screen metering with a vibration drive are also known. For example, DE-AS 1619823 describes a process for the preparation of crystals by flame melting of materials in powder form, wherein a vibrating screen is used as the conveyor unit. The purpose of this vibrating screen is to feed a defined amount of the powder to the flame melting device by vibration. The amount of powder is fed to the vibrating screen in a complex manner by way of a tapping mechanism on a powder storage vessel by means of a striking device arranged on the vessel. The amount of powder situated on the vibrating screen should always be kept constant and small in order to prevent briquetting of the fine powder. To this end, expensive monitoring devices are required.

According to DE-A 3038269, a vibrating screen is integrated in a storage vessel for seed dressing agent in powder form. This storage vessel with an integrated vibrating screen is mounted on the relevant collecting or metering vessel and is used to fill the vessel by metering by means of the vibrating screen. A disadvantage of this procedure is that the storage vessel has to be attached in a complex manner to the collecting or metering vessel by way of additional fixing devices. The screen itself can be changed only in a very labour-intensive and time-consuming manner, if at all. It is scarcely possible to use relatively large storage vessels in view of the size and weight to be fixed to the collecting vessels.

SUMMARY OF THE INVENTION

The present invention provides an easy-to-handle device for metering dry powder materials, which device permits a metering process which does not depend on complex designs, with high accuracy and speed of metering at the metering site, regardless of the form of the metered material and without loss of quality of the material to be metered.

The device for metering dry powders comprises a storage vessel having an outlet, and a free-swinging receiving vessel having a vibratable metering base, wherein said receiving vessel is positioned at the outlet of said storage vessel and wherein the distance between the outlet of the storage vessel and the metering base of the receiving vessel can be dimensioned as a function of the bulk solids properties of the powder material, and the metering base of the receiving vessel is vibrated during metering.

BRIEF DESCRIPTION OF THE DRAWING FIGURE

FIG. 1 is a schematic diagram, in exploded view, of the metering device in accordance with the invention.

DETAILED DESCRIPTION OF THE INVENTION

With reference to FIG. 1, a schematic representation of a metering device according to the invention is illustrated therein. The metering device comprises a storage vessel (1) having an outlet end, represented in FIG. 1 by discharge spout (2). The size and shape of the storage vessel (1) is not critical to the invention, nor is the choice of materials for construction of the vessel. The storage vessel may be a conventional vessel for keeping stocks of powder or liquid material, particularly powder coatings and powder coating components. It is of course preferred that the vessel be constructed of material that will not react with or contaminat the materials contained in the vessel. Although not shown in FIG. 1, storage vessel (1) may include structure for removably closing off the discharge tube (2) such as to control the flow of material through the discharge tube (2). In addition, the storage vessel may be fitted with structure to facilitate discharge of the contents thereof ("discharge aids"), inside and/or outside the vessel, but preferably it is not fitted with such discharge aids. Preferably, the storage vessel has a tapered outlet e.g. in the form of a discharge spout (2).

A receiving vessel (3) is positioned at the outlet of the storage vessel (1) and is connected to the storage vessel (1) by an oscillating bearing (4). The oscillating bearing (4) permits the receiving vessel (3) to be freely movable relative to the storage vessel (1). The oscillating bearing (4) is a mobile suspension device for the receiving vessel (3). One skilled in the art is familiar with how to construct such a device using, for example, compression springs, recirculating ball bearing units, rubber pads, vibration dampers or rubber-metal vibration dampers.

The receiving vessel (3) is provided with a metering base which is preferably in the form of a screen (5). The screen (5) is preferably removably attached to the receiving vessel (3) such as by, for example, a screen holder or frame (13) and suitable fasteners such as bolt and nut fastener (14). It should be understood, however, that the metering base (5) can, if desired, be integral with the receiving vessel (3). It is preferred for the metering base (5) to be removable, however, to faciliate replacement of the metering base (5) at will depending on the metering requirements, e.g. with a different execution, different mesh width and different material of the screen. In the event the metering base (5) is made integral with the receiving vessel (3), the entire receiving vessel (3), including metering base (5), may easily be replaced if necessary, in order to allow fitting with metering bases e.g. with a different mesh width and/or a different design of the screen, depending on the metering requirements.

The metering base used may be a screen of plastic, metal or textile fabric of varying mesh width. The mesh width may be selected as a function of the material to be metered and of the desired metering accuracy and speed and may e.g. be up to 100 μm or 500 μm or 5000 μm or greater.

The receiving vessel (3) is operationally connected to a vibration drive (6), which in turn is operationally connected to the proprotioning valve (8). The vibration drive (6) may be driven electrically or pneumatically and is connected to the receiving vessel (3) by adjustment member (7). The adjustment member (7) permits adjustment of the vibration drive (6) along the vertical and/or horizontal axis thereof. An pneumatically controlled drive is used in preference. The significance and function of the vibration device (6) and proportioning valve (8) is explained hereinbelow.

Positioned below the receiving vessel (3) is the collection vessel (9) which is oriented and configured to collect the powder material exiting from the metering base (5) of the receiving vessel (3). The collection vessel (9) may conveniently be positioned on a weighing device, such as balance (10) to determine the precise quantitiy of powder material collected therein. In the preferred embodiment, the balance (10) is operationally attached to a computer (12), which, in turn, is operationally attached to closure valve (11) and proportioning valve (8).

In operation of the above apparatus to meter powder materials, first the appropriate metering base (5) is selected and installed, either individually or as an integral element of the receiving vessel (3). The receiving vessel (3) is then placed in close proximety to the dischage spout (2) of the stroage vessel (1), such that the metering base (5) is as close as possible to the outlet portion of the discharge spout (2) to avoid lumps or briquettes in the powder material, but not so close that the metering base (5) will contact the discharge spout (2) ether at rest or in its vibrating state. This distance is related to the bulk solid properties of the particular powder material (i.e., fineness of the grain, flow properties loose weight, etc.). By selecting the closest distance based on the bulk solid properties of the material, one ensures that the receiving vessel is not overfilled, and that the material to be metered does not form lumps or briquettes.

The storage vessel (1) can then be filled with the powder material to be metered. It should be understood that if the storage vessel is equipped with an optional means for closing off the discharge spout (2), then the vessel (1) may be filled prior to placement of the metering base (5). In any event, once the powder material and the receiving vessel (3) are in place, metering can begin by engaging the vibration device. Engagement of the vibration device (6)—which can be accomplished by supplying power to the device (6) or, if the device is continuously operating, coupling the device to the receiving vessel (3) (either of which can be done maunally of via computer (12))—will cause the receiving vessel (3) to vibrate. As a result of the oscillating bearing (4) of the receiving vessel (3), gentle vibration impulses are transmitted to the storage vessel (1) during metering, as a result of which it is possible to ensure that no additional discharge aids are required on or in the storage vessel (1) for the material to be metered.

Vibrational frequency of the vibration device (6) is determined and adjusted with the proprtioning valve (8), preferably via computer (12), but optionally manually. The vibration frequency of the vibration drive may be adjusted continuously by means of a proportioning valve in the range from low to high frequency, e.g. in the range from >0 to 6 bar air supply, which corresponds with a frequency range of about 0 to 180 Hz.

The vibrational movement of receiving vessel (3) and metering base (5) results in powder material being metered into the collection vessel (9). Once the desired amount is metered as determined, for example, by the balance (10), the vibration device is dis-engaged, either by turning off power or otherwise decoupling the vibration device (6) from the receiving vessel (3). This may be done manually or, preferably, is done via operation of closure valve (11) and computer (12). It is most preferred that, as the amount metered approaches the desired metering set point, this information is passed by the balance (10) to the computer (12), which in turn controls the vibration drive (6) in such a way that the vibration frequency is reduced, thus ensuring that too much powder material is not metered.

If the storage vessel is to be filled with powder material, this takes place preferably when the vibration drive is switched off, i.e. when the metering base is in the stationary state. This ensures that the powder moves through the outlet opening of the storage vessel and settles on the metering base of the receiving vessel, thereby preventing the powder material passing through the screen mesh of the metering base.

Only when the vibration drive is switched on and the resulting vibratory movement occurs on the metering base does the movement of the powder material through the screen mesh into the collecting vessel take place. Due to the transfer of the vibration impulses, powder material inside the storage vessel is moved in the direction of the outlet opening at the same time.

Free-flowing to poor-flow powder materials that can be metered using the process and apparatus described above are not limited in practice. Preferred materials include, for example, solid paint resins, solid crosslinking agent components and pigments and solid additive materials, preferably with approximately the same grain size spectrum.

The process and apparatus described herein permit metering of powder materials in a simple and cost-saving manner with a high metering speed. For example, a metering output of 180 kg/h can be achieved by using a screen area of 0.02 $m^2$. With problematic powder coating material, e.g. poor-flow feed material, a specific metering output of more than 100 kg/h can be achieved.

A consistently good product quality is guaranteed since the evolution of heat brought about by rotating or rubbing parts, sticking or smearing are avoided due to the metering of even poor-flow feed materials, and so the material quality is not impaired.

We claim:

1. A device for metering dry powders comprising a storage vessel having an outlet, and a free-swinging receiving vessel having a vibratable metering base, said metering base being vibrated during metering, wherein said storage vessel is vertically connected to said receiving vessel aligning said device for metering dry powders along an x axis, further wherein the receiving vessel is positioned at a distance in close proximity to the outlet of said storage vessel, said distance between the outlet of the storage vessel and the metering base of the receiving vessel being dimensioned as a function of the dry powder's bulk solids properties.

2. The device of claim 1 wherein the dimension between the outlet opening of the storage vessel and the metering base of the receiving vessel is such that the metering base does not touch the outlet opening during the metering process.

3. The device of claim 1 wherein the receiving vessel is attached to the storage vessel by an oscillating bearing.

4. The device of claim 3 wherein the oscillation bearing comprises a mobile suspension device containing at least one element selected from the group consisting of compression springs, recirculating ball bearing units, rubber pads, vibration dampers and rubber-metal vibration dampers.

5. The device of claim 1 wherein the metering base comprises a screen.

6. The device of claim 1 wherein the metering base is removable from the receiving vessel.

7. The device of claim 1, further comprising a vibration drive for vibrating the receiving vessel and the metering base, and wherein the vibration drive comprises a pneumatically controlled vibration drive.

8. The device of claim 1, further comprising a collection vessel position to collect powder material metered from said metering base, and wherein the collecting vessel is situated on a balance to measure progress toward a metering set point is measure.

9. The device of claim 8 wherein achievment of the metering set point is determined with the aid of a computer.

10. A process for metering powder materials comprising the step of charging a powder material to a metering device, wherein the metering device comprises a storage vessel having an outlet, and a free-swinging receiving vessel having a vibratable metering base, said metering base being vibrated during metering, wherein said storage vessel is vertically connected to said receiving vessel aligning said device for metering dry powders along an x axis, further wherein the receiving vessel is positioned at a distance in close proximity to the outlet of said storage vessel, said distance between the outlet of the storage vessel and the metering base of the receiving vessel being dimensioned as a function of the dry powder's bulk solids properties.

11. A device for metering dry powders comprising a storage vessel having an outlet, and a free-swinging receiving vessel having a vibratable metering base, wherein said metering base comprises a screen and wherein said metering base is vibrated during metering;

wherein the receiving vessel is positioned at a distance in close proximity to the outlet of said storage vessel, said distance being dimensioned such that the outlet opening of the storage vessel and the metering base of the receiving vessel do not touch during metering, and wherein said distance is further dimensioned as a function of the powder material's bulk solid properties;

further wherein the receiving vessel is attached to the storage vessel by an oscillating bearing, wherein the oscillating bearing comprises a mobile suspension device containing at least one element selected from the group consisting of compression springs, recirculating ball bearing units, rubber pads, vibration dampers, and rubber-metal vibration dampers.

12. The device of claim 11 wherein the metering base is removable from the receiving vessel.

13. The device of claim 11, further comprising a vibration drive for vibrating the receiving vessel and the metering base, wherein said vibration drive comprises a pneumatically controlled vibration drive.

14. The device of claim 11, further comprising a collection vessel to collect powder material metered through said metering base, and wherein the collection vessel is situated on a balance, wherein said balance measures progress toward a metering set point.

15. The device of claim 14 wherein achievement of the metering set point is determined with the aid of a computer.

16. A process for metering powder materials comprising the step of charging a powder material to a metering device, wherein the metering device comprises a storage vessel having an outlet, and a free-swinging receiving vessel having a vibratable metering base, wherein said metering base comprises a screen and wherein said metering base is vibrated during metering;

wherein the receiving vessel is positioned at a distance in close proximity to the outlet of said storage vessel, said distance being dimensioned such that the outlet opening of the storage vessel and the metering base of the receiving vessel do not touch during metering, and wherein said distance is further dimensioned as a function of the powder material's bulk solid properties;

further wherein the receiving vessel is attached to the storage vessel by an oscillating bearing, wherein the oscillating bearing comprises a mobile suspension device containing at least one element selected from the group consisting of compression springs, recirculating ball bearing units, rubber pads, vibration dampers, and rubber-metal vibration dampers.

17. The process according to claim 16 wherein the metering base is removable from the receiving vessel.

18. The process according to claim 16 wherein said device for metering dry powders further comprises a vibration drive for vibrating the receiving vessel and the metering base, wherein said vibration drive comprises a pneumatically controlled vibration drive.

* * * * *